Jan. 20. 1925.  1,523,826
J. A. MUNRO
RESILIENT SHOCK ABSORPTION DEVICE FOR TRACTIVE HAULAGE
OR LIKE CONNECTIONS
Filed July 1, 1924
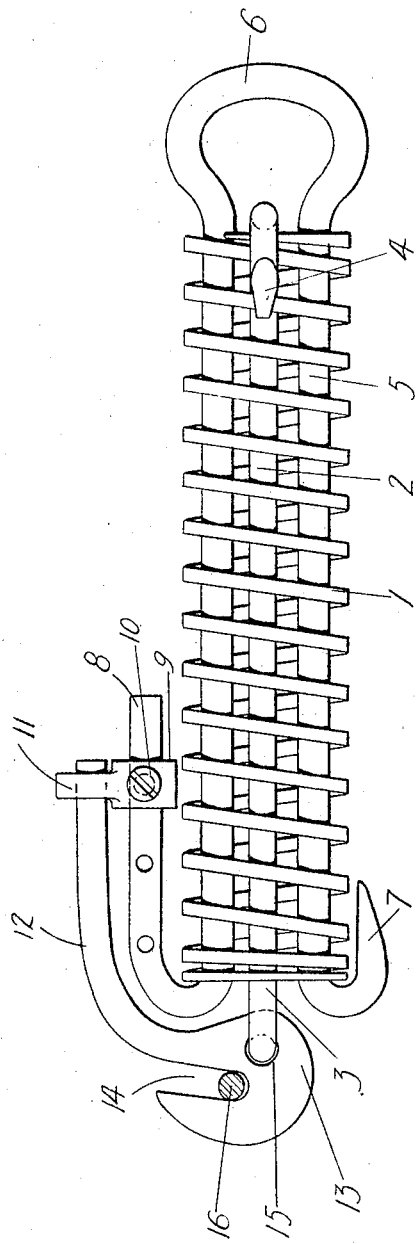
INVENTOR:
JAMES ANGUS MUNRO
BY:
ATTORNEY Patented Jan. 20, 1925.

1,523,826

UNITED STATES PATENT OFFICE.

JAMES ANGUS MUNRO, OF SYDNEY, NEW SOUTH WALES, AUSTRALIA.

RESILIENT SHOCK-ABSORPTION DEVICE FOR TRACTIVE HAULAGE OR LIKE CONNECTIONS.

Application filed July 1, 1924. Serial No. 723,439.

*To all whom it may concern:*

Be it known that I, JAMES ANGUS MUNRO, subject of the King of Great Britain and Ireland, residing at 189 Elizabeth Street, Sydney, New South Wales, Australia, have invented new and useful Improvements in Resilient Shock-Absorption Devices for Tractive Haulage or like Connections, of which the following is a specification.

This invention relates to a spring coupling device usable for traction haulage purposes and generally in any line connection under tensional stress which is liable to shock or is liable to be overstressed. It comprises a helical spring contained between the hooked ends of two yoke rods which are passed reversely through it with the ends of one of the yoke rods extended externally of the helix and forming a carrier for a staple, the position of which is adjustable along it. The staple is engageable with the tail of a haulage hook which is eyed to one of the yokes and this hook is so mouthed that when its tail is freed from the staple a chain or other member engaged by it will be released. The staple is adjusted in each case at the appropriate position on the carrier for permitting a predetermined flexure of the spring before the hook tail is drawn out of the staple eye. Irregularities in the tension due to variation in the load or variation in the pull are cushioned and absorbed in the spring. When the load exceeds the value predetermined by the positional setting of the staple, a draught chain or other member which is engaged by the hook is released automatically and shock or damage which might otherwise result is avoided.

The device is illustrated in elevational view in the accompanying drawing. The moments of the spring and the dimensions of the rods of which the yokes are formed are proportioned to the nature of the load, being made heavier or lighter according to circumstances.

1 is a helical spring. 2 is a rod bent to form a foot yoke 3. The legs of this yoke are passed upward through the spring 1 and are then bent backward as shown at 4 in order to contain and embrace the top end convolutions of the spring 1. 5 is a rod bent to form a similar yoke. The legs of this yoke 6 are passed down through the spring 1. The end 7 of one of these legs is up-turned to contain and embrace the bottom end of the spring 1 in the same manner as the bent ends 4 of the rod 2 contain and embrace the top end of the spring. The rod forming the other end of the yoke 6 is upbent and set parallel with the spring axis; it forms a carrier 8 for a staple 9 which is adapted to be slid along it and to be fixed at any one of a number of positions upon it by means of a pinching screw 10 or equivalent device. This staple 9 carries an eye 11 which is adapted to slip over the long bent tail 12 of a hook 13. The jaw 14 of the hook 13 is disposed transversely but a little angularly to the spring axis and it does not extend to below the centre of the hook eye 15 by which the hook 13 is hung on the yoke 3. The yoke legs are always in tension under conditions of use. They function not only to sustain the working load, but also to maintain the axial alignment of the helical spring 1, which would cripple under heavy compression if unsupported transversely of its length.

As the direction of pull on a chain link or any other member 16 which is embraced in the hook jaw 14 is substantially axial to the spring, the hook 13 is subject to an overturning moment, but it is maintained in engagement with the member 16 so long as its tail 12 is held in the staple eye 11. When the tension augments, the tail 12 of the hook 13, consequent on its downward movement in relation to the spring 1, slides through the eye 11 of the staple 9, and when the tension exceeds the prearranged limit, the lever tail 12 clears the staple eye 11, whereupon the hook 13 overbalances and frees the member 16. When the device is used in connection with tug chains on plows or like implements, the draught is released when an obstacle such as a stump or a heavy stone is encountered.

The haulage connection 16 is engaged by merely dropping it into the hook mouth 14. After release action has occurred, the connection may be re-established with great readiness, the hook tail 12 being first replaced in the eye 11 of the lug before the member 16 is replaced in the hook mouth 14.

What I claim as my invention and desire to secure by Letters Patent is;—

1. A spring coupling device of the kind described, characterised by a spring having two yokes which are anchored to the said spring and one of the said yokes having a prolonged upbent end, a staple adjustable in position on said prolonged end, and a hook adapted to be automatically released from engagement with the said staple on the tension exceeding a predetermined amount represented by the adjustment of the said staple.

2. A spring coupling device comprising a helical spring, two reversely arranged yoke rods threaded through said spring with the ends of said rods reversely bent to contain the opposite ends of said spring and one end of one of said rods prolonged substantially parallel with the spring axis, an adjustable staple fitted on said prolonged rod end, an overbalancing hook eyed on the other of said yoke rods, the tail of said hook being adapted to be engaged by the said staple.

In testimony whereof I affix my signature.

JAMES ANGUS MUNRO.